(12) United States Patent
Sihler et al.

(10) Patent No.: US 8,743,514 B2
(45) Date of Patent: Jun. 3, 2014

(54) HVDC POWER TRANSMISSION WITH CABLE FAULT RIDE-THROUGH CAPABILITY

(75) Inventors: Christof Martin Sihler, Hallbergmoos (DE); Simon Herbert Schramm, Munich (DE); Emad Ezzat Ahmed, Garching (DE); Gorm Sande, Slependen (NO); Rainer Hoffman, Skien (NO)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/093,058

(22) Filed: Apr. 25, 2011

(65) Prior Publication Data
US 2012/0268099 A1 Oct. 25, 2012

(51) Int. Cl.
*G05F 3/08* (2006.01)
(52) U.S. Cl.
USPC ............................................. 361/54
(58) Field of Classification Search
CPC ............... G05F 3/08; H02H 7/26; H02J 1/00; H02J 1/08; H02J 3/26; H02J 3/36; Y02E 60/60
USPC ........................................................ 361/54
See application file for complete search history.

(56) References Cited

U.S. PATENT DOCUMENTS

| 6,992,490 | B2 * | 1/2006 | Nomoto et al. ................ 324/522 |
| 7,830,679 | B2 * | 11/2010 | Radbrant et al. ................ 363/35 |
| 2009/0301747 | A1 | 12/2009 | Asplund et al. | |
| 2010/0133901 | A1 * | 6/2010 | Zhang et al. .................... 307/11 |

FOREIGN PATENT DOCUMENTS

EP 1006612 A1 6/2000

OTHER PUBLICATIONS

Molburg, J. C. et al., "The Design, Construction, and Operation of Long-Distance High-Voltage Electricity Transmission Technologies", Nov. 2007, Argonne National Laboratory, pp. 44-48.*

* cited by examiner

*Primary Examiner* — Jared Fureman
*Assistant Examiner* — Kevin J Comber
(74) *Attorney, Agent, or Firm* — Andrew J. Caruso

(57) ABSTRACT

A high voltage direct current (HVDC) power transmission system includes a cable fault ride-through system. The cable fault ride-through system is configured to ensure the HVDC power transmission system remains operational via an earth path between the power source end and the load end during a transmission cable fault, even in the absence of a neutral bus and/or dc circuit breakers.

18 Claims, 7 Drawing Sheets

HVDC POWER TRANSMISSION WITH CABLE FAULT RIDE-THROUGH CAPABILITY

BACKGROUND

This invention relates generally to transportation of electrical power to sub-sea electrical equipment such as a motor driving a compressor/pump located far away from the shore, and more particularly to a system and method for continuing to power sub-sea electrical equipment during an electrical cable fault.

Transportation of electrical power to oil and gas sub-sea electrical equipment often requires high power to be transported over long distances. Transmission to sub-sea equipment is used to supply the power from an onshore utility to a point where the power is distributed among individual loads. Generally, a step down transformer is implemented in order to bring the high voltage level of the transmission stage to a lower voltage level for a distribution stage to individual units of the electrical equipment. Distribution distances are typically shorter than the transmission distance; and the voltage levels to be supplied to individual loads or load clusters are lower than the voltage levels of the transmission stage. Typically, power on the order of 50 megawatts is transmitted by high voltage alternating current (AC) transmission cables to a high voltage transformer, thereafter stepping down the voltage for a medium voltage AC distribution system.

One commonly used nominal voltage is 132 kV (which is considered to be a high voltage for power transmission). Transmission voltages of +/100 kV or higher are used in HVDC transmission projects where high power is transmitted over long distance (e.g., in transmitting 100 MW or 200 MW over a distance of 100 or 200 km).

AC transmission provides technical challenges for applications where bulk power is transmitted over long cables. The cable stray capacitance causes charging current to flow along the length of the AC cable. Because the cable must carry this current as well as the useful load current, this physical limitation reduces the current carrying capability of the cable. Because capacitance is distributed along the entire length of the cable, longer lengths produce higher capacitances, thus resulting in higher charging currents.

Typically, multiphase booster pumps require electrically driven motors delivering a shaft power between 2 MW and 6 MW. Future offshore oil and gas resource installations will require pump installations at distances above 50 km from the shore. Such distances require a high voltage power transmission; however, high voltage AC transmission is very costly when supplying single sub-sea pumps or clusters of a few sub-sea pumps only, where the power to be transmitted is at or below 20 MW.

Further, sub-sea motors driving a gas compressor typically have a higher nominal power (e.g., in the order of 10 or 15 MW). As such, sub-sea compression clusters may be required to transmit a total power in the order of 50 to 100 MW over a distance of 100 or 200 km. The transmission of high power over a distance of more than 100 km and distributing the power sub-sea is very challenging with AC transmission and distribution systems because of the high charging currents and the high number of components involved in the distribution system.

In general, DC transmission can be achieved more efficiently over long distances than AC transmission. High voltage (HV) DC transmission typically requires the usage of power electronic converters in the transmission systems that are capable of converting between HVAC and HVDC. Each switch of the converter for conventional HVDC converter topologies is designed to handle high voltages. The converter nominal voltage may range from tens-of-kilovolts to hundreds-of-kilovolts, depending upon the application. Such switches are typically configured utilizing a plurality of series connected semiconductor devices (e.g., such as insulated gate bipolar transistors (IGBTs) and thyristors). Because of the size and the high number of components involved, conventional HVDC terminals are not well suited for sub-sea installations.

Converters are also required on the load side of a power distribution system when supplying variable speed motors in addition to the power conversion required for HVDC transmission. Typically, a high voltage transformer is used to step down the voltage from the AC or DC transmission level to the voltage level used in the AC power distribution system. On the load side of the distribution system, the converters convert the power from fixed frequency AC voltage (stepped down from the transmission system) to a variable frequency AC voltage of individual motors that must be controllable over a wide speed range when driving sub-sea pumps or compressors.

Modular stacked DC converter architectures are well suited for sub-sea applications requiring transmission and distribution over long distances. Unlike other DC transmission options, e.g. where the dc transmission (link) voltage is controlled, i.e. maintained nearly constant, the dc transmission (link) current is controlled in a modular stacked dc converter. One MSDC architecture 10 is depicted in FIG. 1. The MSDC architecture gets its name from the fact that the architecture uses several dc-dc converter modules stacked and connected in series, both at the sending end and at the receiving end of the transmission link such as depicted in FIG. 1.

The sending end/top-side converters 12 comprise a set of ac-dc converters 14, which draw power from the ac mains or grid 16. Each of these converters 14 is cascaded by a dc-dc converter 18. These dc-dc converters 18 are connected in series and they are controlled so as to regulate the current in the dc cable 20 connecting the top-side 12 to the sub-sea installation 22. The receiving-end/sub-sea side 22 also comprises several dc-dc converters 19 connected in series. Each of these converters 19 is cascaded by a dc-ac inverter/motor drive 24. These dc-dc converters 19 are controlled to regulate the dc link voltage to that required by the down-stream motor drive 24. Although FIG. 1 depicts two-level converters used for the ac-dc, dc-dc and dc-ac converter modules, it shall be understood that at high power levels, multi-level stacks will be used for these converter modules.

High voltage direct current (HVDC) transmission has technical and commercial advantages that increase with the distance of the power transmission. Sub-sea power transmission is always based on sub-sea high voltage (HV) cables and umbilicals. With increasing cable length, the probability of a cable fault increases. Repairing sub-sea cables is costly and typically takes a long time i.e. months rather than weeks. In view of the foregoing, there is a need to provide an HVDC transmission system that can be kept operating regardless of a transmission cable fault.

BRIEF DESCRIPTION

An exemplary embodiment of the present invention comprises a high voltage direct current (dc) power transmission/distribution network that includes a power source side and a load side. The network further comprises a dc power transmission cable, a dc power return cable, a source side earthing electrode associated with each cable, a load side earthing electrode associated with each cable, a pair of source side disconnecting switches associated with each cable, and a pair of load side disconnecting switches associated with each cable. The transmission and return cables are configured together with corresponding earthing electrodes and disconnecting switches to continuously provide dc current to the load side via an earth path during a cable fault, wherein the earth path is parallel to and in close proximity to the faulted cable.

According to another embodiment, a high voltage direct current (HVDC) power transmission and distribution network comprises a cable fault ride-through system configured to enable a direct current earth transmission path and subsequently to isolate a faulted transmission cable from the HVDC network in order to enable the direct current transmission earth path, such that the HVDC network remains operational during a transmission cable fault. The HVDC network according to one embodiment is devoid of and operates in the absence of a neutral bus. The HVDC network according to another embodiment is also devoid of and operates in the absence of dc circuit breakers.

According to yet another embodiment, a high voltage direct current (HVDC) power transmission system comprises a cable fault ride-through structure devoid of a neutral bus and is configured to ensure the HVDC power transmission system remains operational via an earth path during a transmission cable fault. Another embodiment comprises a cable fault ride-through structure devoid of dc circuit breakers and is configured to ensure the HVDC power transmission system remains operational via an earth path during a transmission cable fault.

DRAWINGS

The foregoing and other features, aspects and advantages of the invention are apparent from the following detailed description taken in conjunction with the accompanying drawings in which like characters represent like parts throughout the drawings, wherein.

Figure 6:
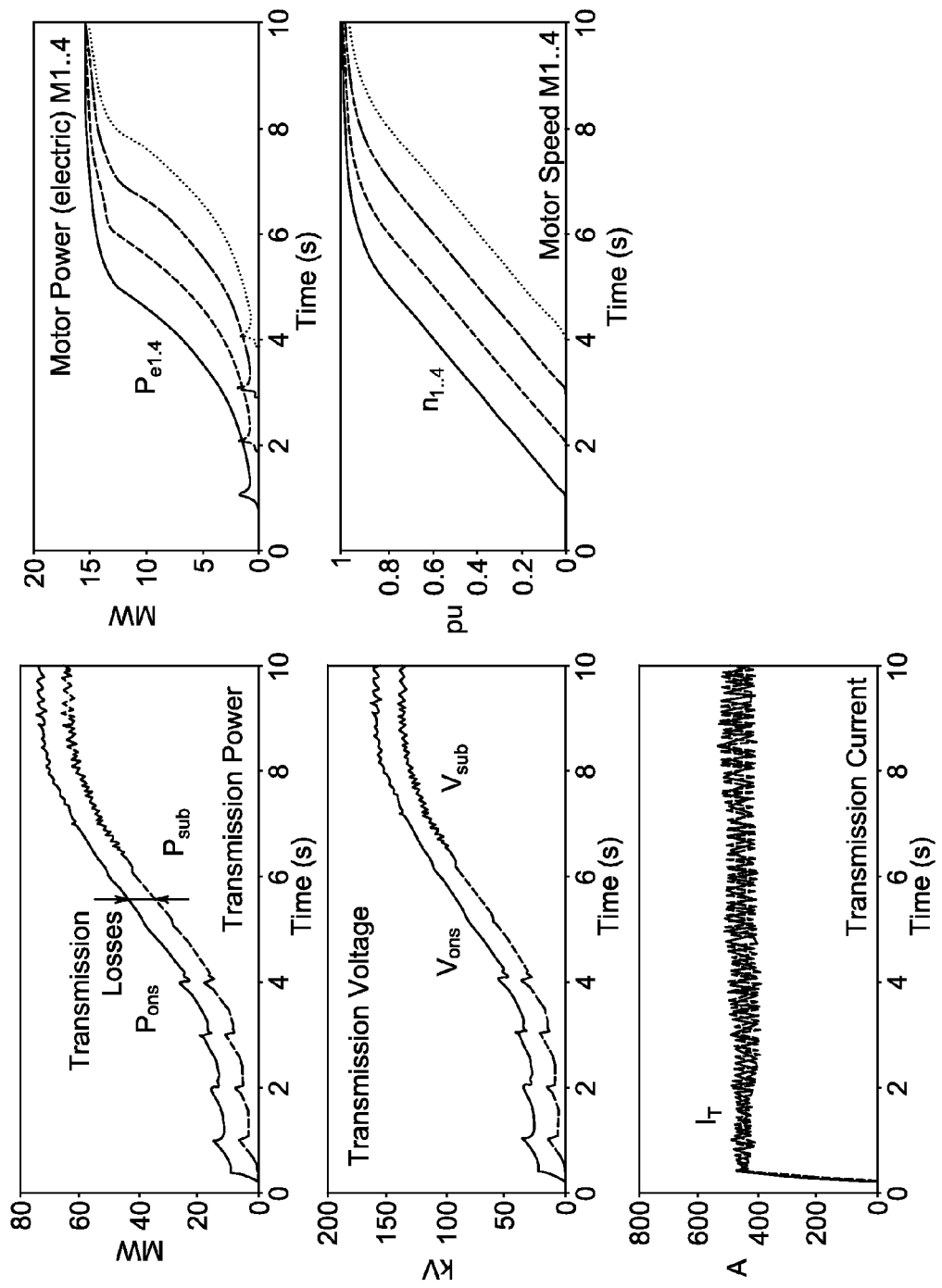
Figure 7:
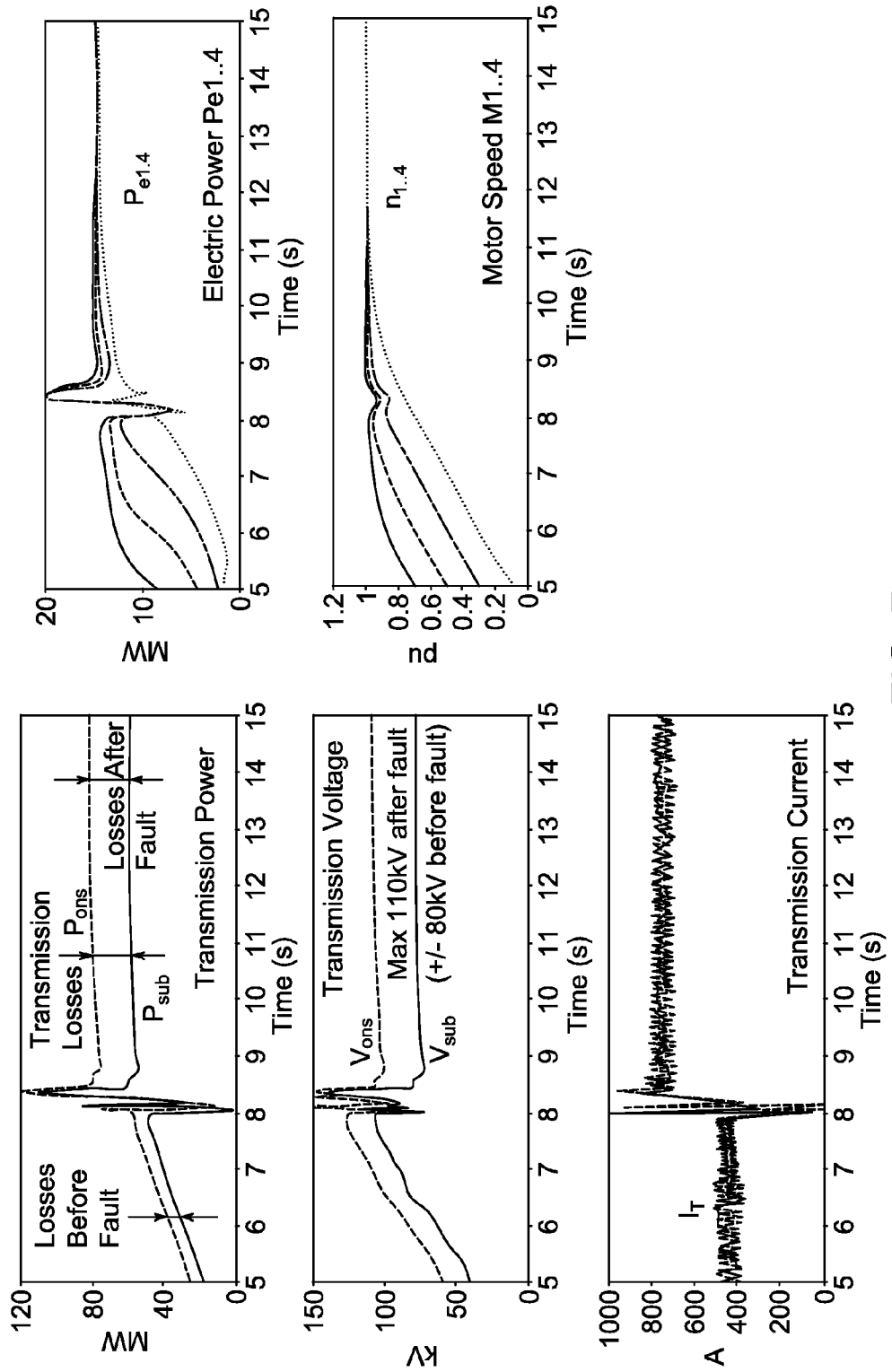

FIG. 6 is a set of graphs illustrating operational parameters during fault-free start-up conditions for a group of electrical loads for one embodiment of a simulated HVDC transmission/distribution system; and FIG. 7 is a set of graphs illustrating operational parameters prior to, during, and subsequent to a cable fault for the group of electrical loads depicted in FIG. 6 for a simulated HVDC transmission/distribution system that employs cable fault ride through principles according to one embodiment.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

A general advantage of the modular stacked direct current (MSDC) topology depicted in FIGS. 1-4 described in further detail herein is that the transmission voltage is not controlled and can be set to any value below the maximum operating voltage. Only the ring current of this series-connected converter topology is controlled, in contrast to conventional HVDC systems.

The present inventors recognized that such a twin cable dc current controlled system could be configured to provide a HVDC transmission/distribution network capable of sustaining operation of electrical equipment such as, without limitation, a sub-sea motor driving a compressor/pump located far away from the shore, even during an electrical transmission cable fault.

Figure 1:
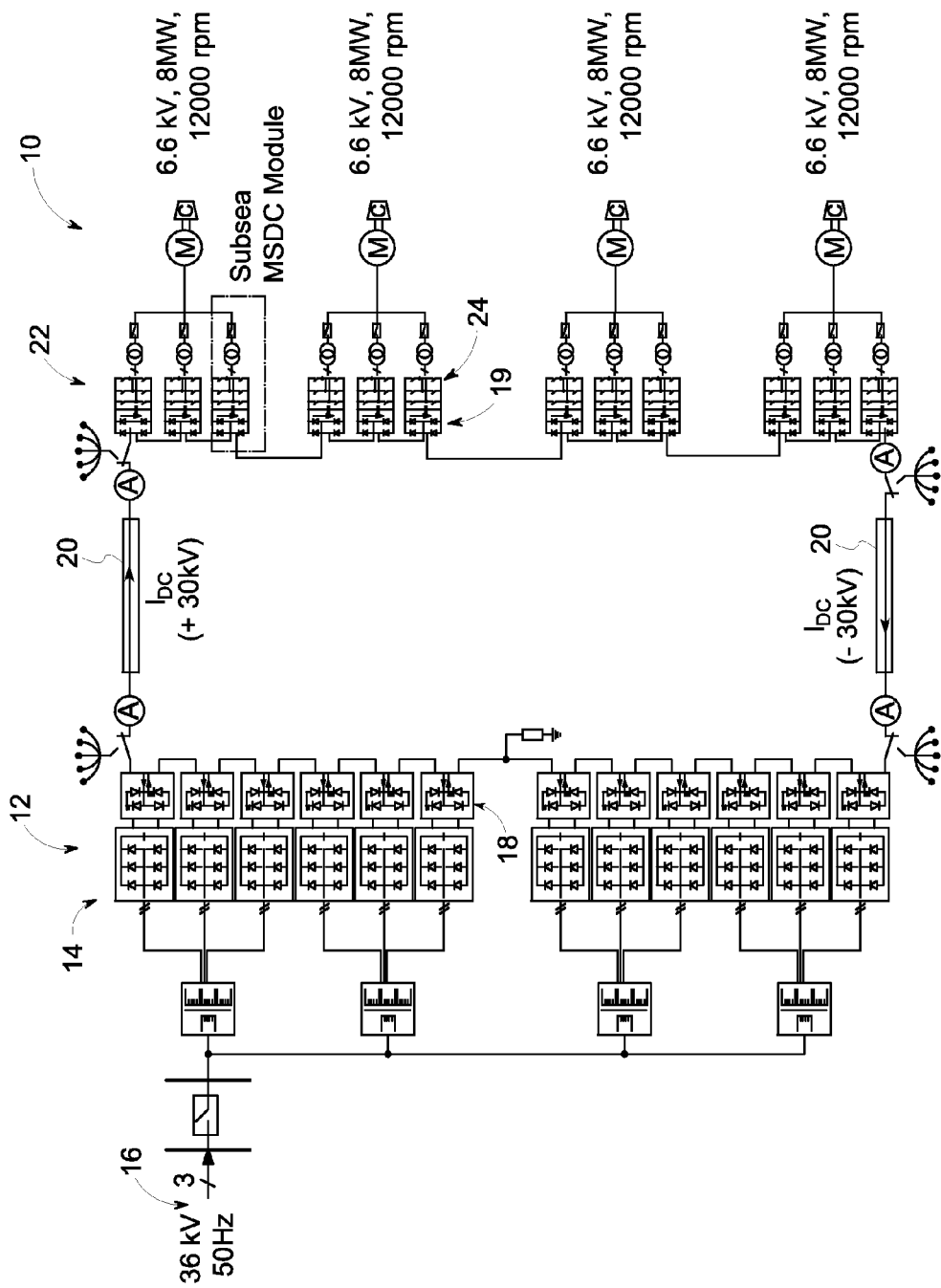
FIG. 1 is a simplified diagram illustrating a high voltage dc (HVDC) power transmission/distribution system with modular stacked power converter building blocks on both the on-shore side and sub-sea side of the system according to one embodiment of the invention.
Figure 2:
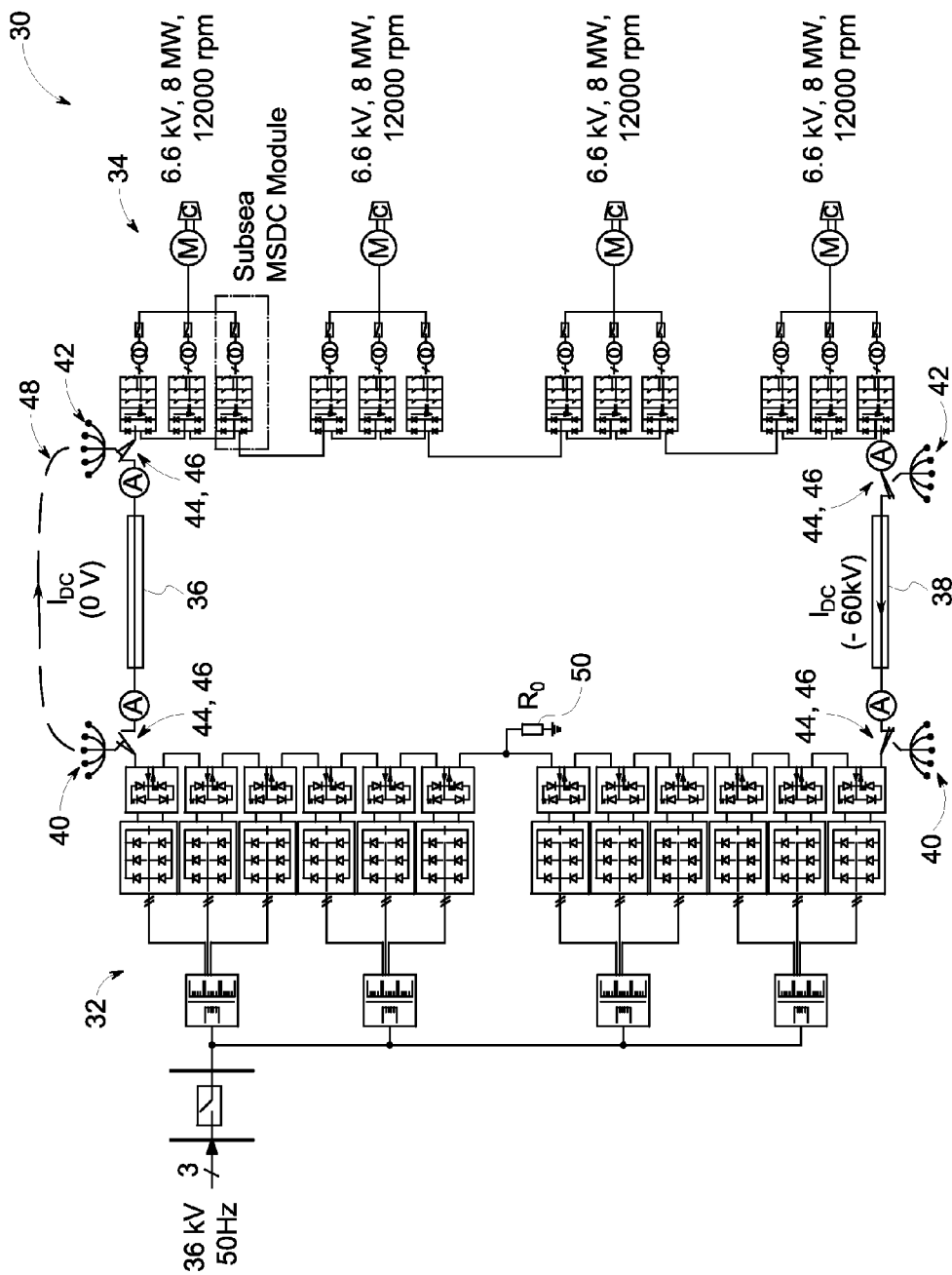
FIG. 2 illustrates the HVDC system depicted in FIG. 1 that is now operating at full power and maximum dc transmission voltage via an earthing path during a dc transmission cable fault.

According to one embodiment illustrated in FIG. 2, a high voltage direct current (dc) power transmission/distribution network 30 comprises a power source side 32 and a load side 34. The network 30 further comprises a dc power transmission conductor 36, a dc power return conductor 38 (both of them typically integrated in one subsea DC cable), a source side earthing electrode 40 associated with each cable 36, 38, a load side earthing electrode 42 associated with each cable 36, 38, a pair of source side disconnecting switches 44, 46 associated with each cable 36, 38, and a pair of load side disconnecting switches 44, 46 associated with each cable 36, 38. The transmission and return cables 36, 38 are configured together with corresponding earthing electrodes 40, 42 and disconnecting switches 44, 46 to continuously provide dc current to the load side 34 via an earth path 48 during a cable fault, wherein the earth path 48 is parallel to and in close proximity to the faulted cable. HVDC transmission/distribution system earthing electrodes suitable for use to implement the embodiments described herein are well known, and so further details regarding such earthing electrodes are not described herein to preserve brevity and enhance clarity with respect to understanding the principles disclosed herein.

More specifically, rather than employ a change-over switch such as that employed in a conventional HVDC transmission/distribution system, the HVDC transmission/distribution system 30 employs two distinct disconnectors 44, 46 at each cable end/earthing electrode 40, 42. When a cable fault is detected, e.g. by means of detecting a current in earthing resistor $R_0$ 50, one of the disconnectors 44 at each end of the faulted cable, that are configured together with a corresponding disconnector 46 as a make-proof switch at each end, is instantly closed to enable current flow through the earth path 48. Suitable switch closure times can be achieved in less than 20 msec using commercially available switchgear. In this way, a parallel dc current path is enabled, bypassing the faulty cable. During a period of time subsequent to closure of switches 44, the faulty cable and the earth are sharing the dc current. Following closure of switches 44, corresponding switches 46 at each end of the faulted cable are opened, fully commutating the dc current to the earth path 48 and isolating the faulty cable.

The foregoing switching process advantageously does not require use of a dc circuit breaker since the current is commutated to a parallel, low resistive path through the earth. It is noteworthy that the high voltage direct current (dc) power transmission/distribution network 30 does not employ a neutral bus with earthing electrodes when bypassing a faulty cable. The foregoing switching process further advantageously allows a service team to access the faulty cable and repair or replace the faulty section of cable. During the repair/replacement process, dc power transmission can remain in operation with one cable now operating at earth potential without adversely impacting operation of electrical loads such as sub-sea motors. Transmission/distribution system 30, for example, continues in one embodiment to operate without use of upper transmission cable 36 in which lower return cable 38 now operates at −60 kilovolts (kV).

Figure 3:
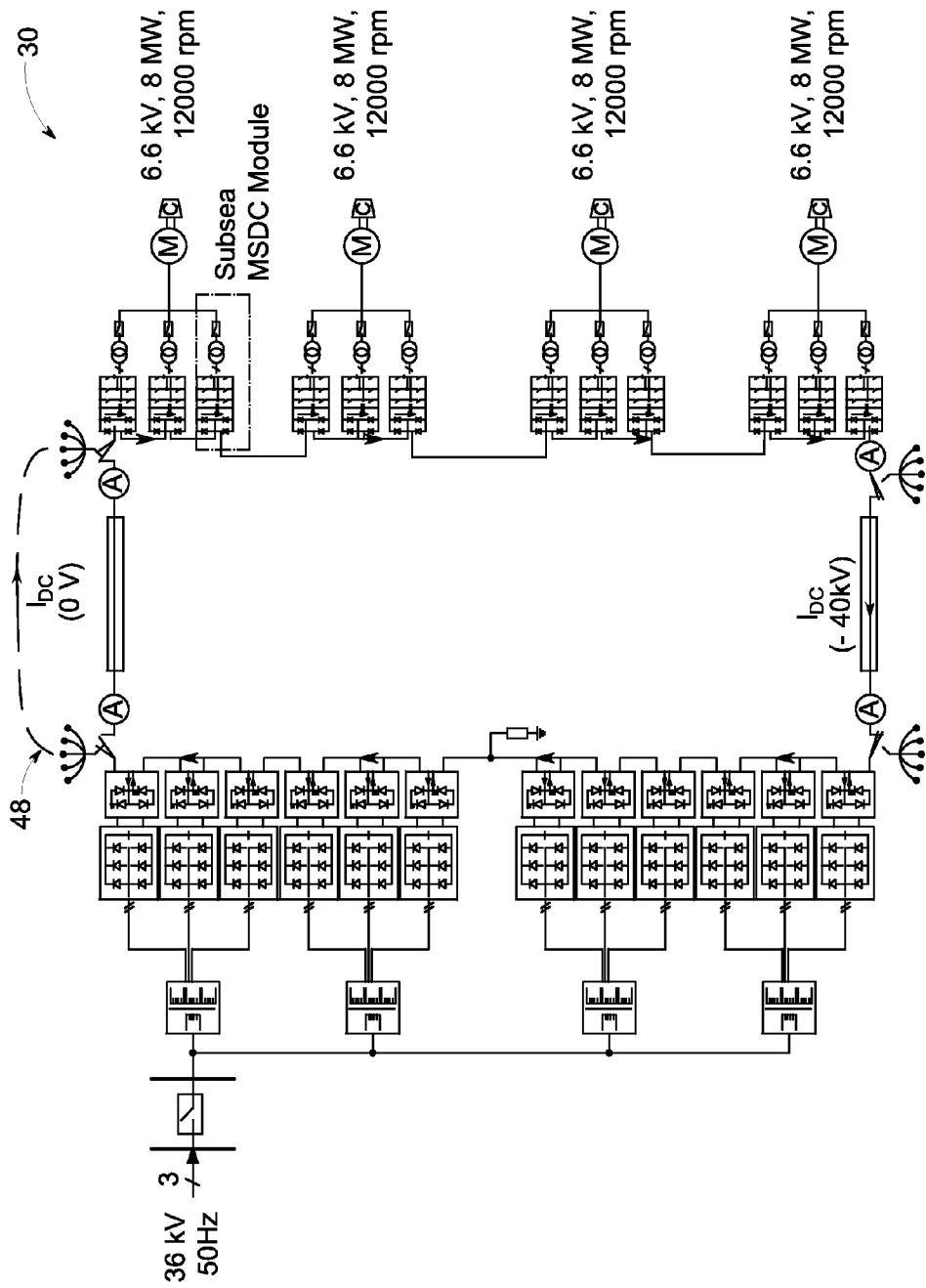
FIG. 3 illustrates the HVDC system depicted in FIG. 1 that is now operating at full power and a reduced dc transmission voltage via an earthing path during a dc transmission cable fault.
Figure 4:
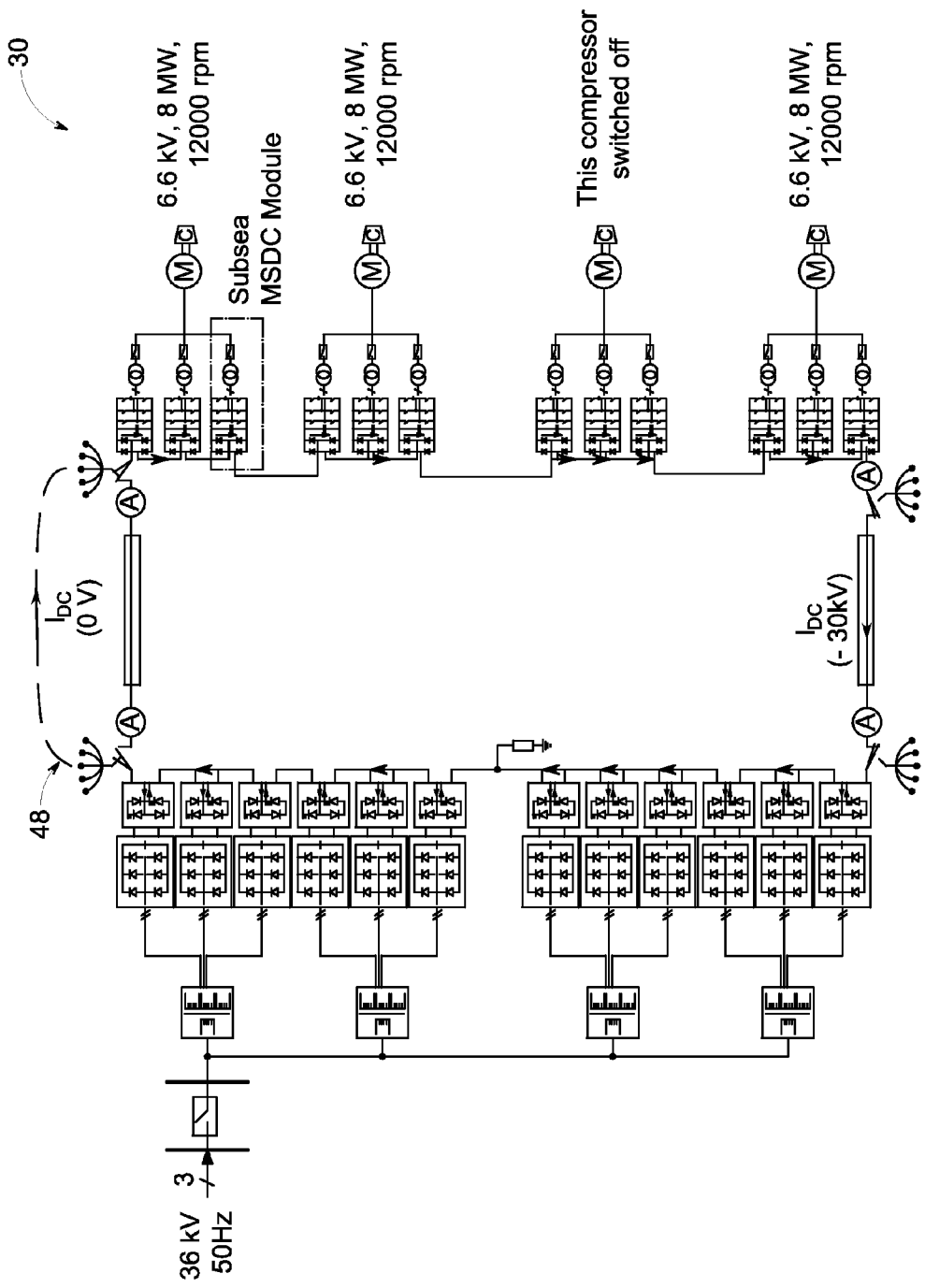
FIG. 4 illustrates the HVDC system depicted in FIG. 1 that is now operating at reduced power and a reduced dc transmission voltage via an earthing path during a dc transmission cable fault.

FIG. 3 illustrates the HVDC system 30 depicted in FIG. 2 that is now operating at full power and a reduced dc transmission voltage of −40 kV via earthing path 48 during a dc transmission cable fault; while FIG. 4 illustrates the HVDC system 30 depicted in FIG. 2 that is now operating at reduced power and a reduced dc transmission voltage of −30 kV via earthing path 48 during a dc transmission cable fault.

The present inventors recognized that increasing the transmission current to retain system operation despite a transmission cable fault is possible since systems such as MSDC transmission systems typically have thermal margin. The cross-section of the dc transmission cable 36, 38 is dictated by the acceptable voltage drop, i.e. ohmic loss, rather than by thermal limits. Therefore, operation at nominal power can continue without having to exceed a desired operating voltage such as 40 kV depicted in FIG. 3 for one embodiment. A particular advantage of an MSDC control and protection system implemented according to the principles described herein is that high dc fault currents cannot occur in this transmission current controlled topology. Therefore, low cost disconnectors and a comparably low cost earthing electrode structure can be used at the converter terminals.

Figure 5:
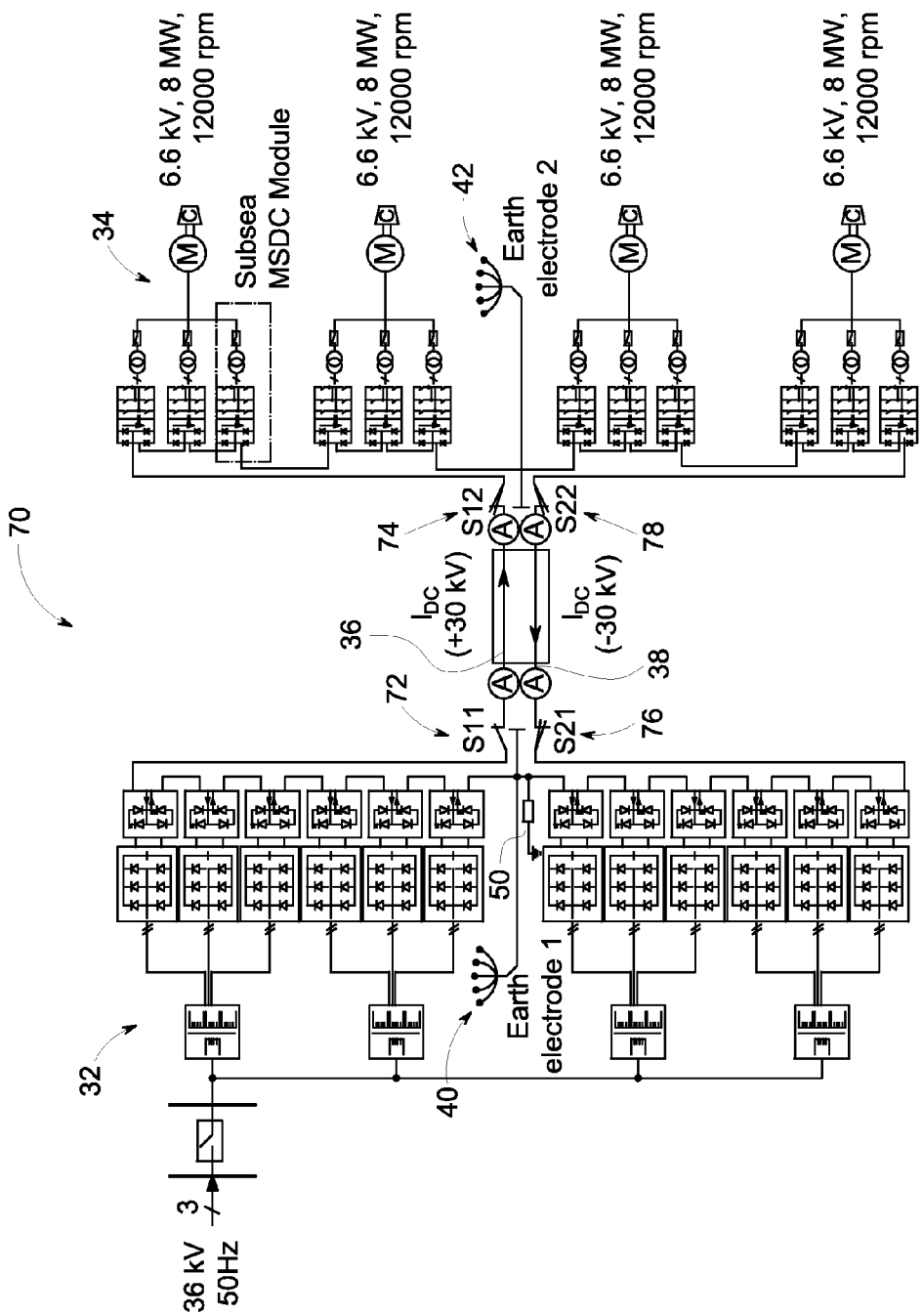
FIG. 5 is a simplified diagram illustrating a HVDC power transmission/distribution system with modular stacked power converter building blocks on both the on-shore side and sub-sea side of the system according to another embodiment of the invention.

FIG. 5 is a simplified diagram illustrating a high voltage dc power transmission/distribution system 70 with modular stacked power converter building blocks on both the on-shore side 32 and sub-sea side 34 of the system according to another embodiment of the invention. It can be seen that HVDC system 70 is devoid of both dc breakers and any neutral buses since the principles of operation do not require these features. HVDC system 70 operates in similar fashion to that described herein with reference to FIGS. 1-4. Switches 72 and 74 operate if an earth fault occurs with transmission cable 36; while switches 76 and 78 operate if an earth fault occurs with return cable 38. Each switch 72-78 comprises two distinct disconnectors configured as a make-proof switch at each cable end/earthing electrode 40, 42. When a cable fault is detected, e.g. by means of detecting a current in earthing resistor $R_0$ 50, one of the switch disconnectors at each end of the faulted cable is instantly closed to enable current flow through the earth path. During a period of time subsequent to closure of the first set of switch disconnectors, the faulty cable and the earth are sharing the dc current. Following closure of the first set of switch disconnectors, a second disconnector at each end of the faulted cable is opened, fully commutating the dc current to the earth path and isolating the faulty cable.

High power earthing electrodes are costly. They must be designed to enable a low impedance current path to earth in a saltwater environment/ground environment and avoid electrochemical reactions, e.g. corrosion. One advantage of the topology shown in FIG. 5 is that only two earthing electrodes are needed, one on the topside and one on the subsea side of the DC power transmission system.

Another way of reaching acceptable costs for the earthing electrodes shown in FIGS. 1-5 is to design them for a limited operation period only, e.g. eight weeks. Their design life can be limited to the time period(s) needed for repairing a faulty subsea cable. The earth electrodes only have to provide a low impedance current path to earth if a cable fault occurred that has not been repaired yet. This is different from a conventional monopolar HVDC current transmission application where the earth electrodes are extremely expensive because they must be designed for enabling a low impedance current path to earth for more than 10 years.

In summary explanation, exemplary embodiments of a high voltage direct current power transmission/distribution network have been described herein that include a power source side 32 and a load side 34. The network 30, 70 further comprises a dc power transmission cable 36, a dc power transmission return cable 38, at least one source side earthing electrode 40, at least one load side earthing electrode 42, a pair of source side disconnecting switches 44, 46 associated with each cable 36, 38, and a pair of load side disconnecting switches 44, 46 associated with each cable 36, 38. The transmission and return cables 36, 38 are configured together with corresponding earthing electrodes 40, 42 and disconnecting switches 44, 46 to continuously provide dc current to the load side 34 via an earth path 48 during a cable fault, wherein the earth path 48 is parallel to and in close proximity to the faulted cable. Use of earth paths are familiar to and known by those skilled in HVDC transmission/distribution systems, and so further details regarding such earth paths are not described herein to preserve brevity and enhance clarity with respect to understanding the principles disclosed herein.

FIG. 6 is a set of graphs illustrating operational parameters during fault-free start-up conditions for a group of electrical loads for one embodiment of a simulated HVDC transmission/distribution system. The three graphs on the left side of FIG. 6 depict the transmission system power, transmission system voltage and transmission system current respectively. The three graphs on the right side of FIG. 6 depict the motor load power, motor load speed and motor load airgap torque respectively and show that operational stability is achieved at about eight seconds from start-up. A real start-up would be performed in minutes, rather than seconds, with much lower ramp rates but this is not relevant for the simulation results.

FIG. 7 is a set of graphs illustrating operational parameters prior to, during, and subsequent to a cable fault for the group of electrical loads depicted in FIG. 6 for a simulated HVDC transmission/distribution system that employs cable fault ride through principles according to one embodiment. Although a cable fault via for example an arc can barely be detected in the current or voltage, e.g. 600 km cable, ~42 Ohms, during the early fault stage, such a fault will contact the voltage potential at the fault location to the earthing resistor 50 depicted in FIGS. 2 and 5, assuming a low resistance through water/ground or knowledge about this resistivity. This voltage drop or the current flow in the earthing resistor can be used to trigger the fault ride-through contacting earthing electrodes 40, 42 and increase the transmission current to keep the system running such as depicted in FIG. 7. According to one aspect, the earthing resistor 50 is installed onshore. According to another aspect, the earthing resistor has a value greater than about 10 kOhms. According to yet another aspect, the voltage drop along the earthing resistor can be employed to determine the fault location.

Although the cable fault ride-through principles described herein may not be suitable for permanent HVDC power transmission/distribution applications, they are particularly useful to maintain HVDC transmission/distribution system operation during periods of time to repair and/or replace faulted HVDC cables. Since repairing a sub-sea cable, for example, typically requires a long period of time, i.e. weeks rather than days, it is especially advantageous to implement an HVDC transmission system that can be kept operating despite a transmission cable fault.

Although not obvious from the Figures, in some cases the subsea loads may be tens of kilometers apart from each other and connected by a DC cable. The four (4) subsea loads depicted in FIG. 1, for example, may be tens of km distant from each other and interconnected by a DC cable of significant length. In such an embodiment, the cable fault ride-through technology and principles described herein may also be applied to achieve the desired results. Thus, the cable fault ride-through technology is applied within the subsea distribution system (meaning between individual loads that are remote from one another).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A high voltage direct current (HVDC) power transmission and distribution system comprising:
   a power source side for increasing a dc current level at a fixed dc voltage level;
   a load side, wherein the power source side and the load side each comprise a modular-stacked direct current architecture, and further wherein the load side comprises a plurality of subsea loads;
   a dc power transmission conductor;
   a dc power return conductor;
   a source side earthing electrode;
   a load side earthing electrode;
   a pair of source side switches associated with each conductor; and
   a pair of load side switches associated with each conductor, wherein the power source side, dc power transmission conductor, and dc power return conductors are configured together with corresponding earthing electrodes, source side switches and load side switches to enable a direct current earth path between the power source side and the load side, and subsequently increase without interruption, a level of dc current transmitted at a fixed level of dc voltage from the power source side to the load side via the direct current earth path during a fault in the dc power transmission conductor or the dc power return conductor, wherein the direct current earth path is parallel to and in close proximity to the faulted conductor.

2. The HVDC power transmission and distribution system according to claim 1, further comprising an earthing resistor configured to provide a voltage drop sufficient to determine a conductor fault location associated with the HVDC system.

3. The HVDC power transmission and distribution system according to claim 2, wherein the earthing resistor has a value greater than 10 kOhms.

4. The HVDC power transmission and distribution system according to claim 1, further comprising two or more earthing resistors configured to provide a current flow sufficient to determine a conductor fault location associated with the HVDC system.

5. The HVDC power transmission and distribution system according to claim 4, wherein at least one earthing resistor has a value greater than 10 kOhms.

6. The HVDC power transmission and distribution system according to claim 1, wherein the pair of source side switches and load side switches associated with each of the conductors are configured together to enable dc current sharing between the faulted conductor and the earth path prior to isolating the faulted conductor from the HVDC system.

7. The HVDC power transmission and distribution system according to claim 1, wherein the source side comprises power generation from renewable energy sources.

8. The HVDC power transmission and distribution system according to claim 1, wherein the transmission and return conductors are further configured together with corresponding earthing electrodes, source side switches and load side switches to isolate the faulted conductor from the HVDC system subsequent to enabling the earth path.

9. The HVDC power transmission and distribution system according to claim 1, wherein the dc power transmission cable is greater than 200 km in length.

10. A high voltage direct current (HVDC) power transmission and distribution network comprising:
    a power source side for increasing a dc current level at a fixed dc voltage level;
    a load side, wherein the power source side and the load side each comprise a modular stacked direct current architecture, and further wherein the load side comprises a plurality of subsea loads;
    a dc power transmission conductor;
    a dc power return conductor;
    a cable fault ride-through system configured to enable a direct current earth transmission path from the power source side to the load side, and subsequently to isolate one of a faulted dc power transmission conductor or a faulted dc power return conductor from among the dc power transmission and dc power return conductors from the HVDC network in order to enable the direct current transmission earth path, such that a level of dc current transmitted to the load side at a fixed dc voltage level is increased at the fixed dc voltage level without interruption during a fault in the dc power transmission conductor or the dc power return conductor, wherein the cable fault ride-through system comprises:
    a pair of first switches associated with a first end of the faulted conductor; and
    a pair of second switches associated with a second end of the faulted conductor, wherein a first switch and a second switch are configured to enable the direct current transmission earth path no later than 20 msec following a first occurrence of the conductor fault, and further wherein the remaining first switch and remaining second switch are configured to disable the faulted conductor from the HVDC network no later than 100 msec following enablement of the direct current transmission earth path.

11. The HVDC power transmission and distribution network according to claim 10, further comprising an earthing resistor configured to provide a voltage drop sufficient to determine a conductor fault location associated with the HVDC network.

12. The HVDC power transmission and distribution network according to claim 11, wherein the earthing resistor has a value greater than 10 kOhms.

13. The HVDC power transmission and distribution network according to claim 10, further comprising two or more earthing resistors configured to provide a current flow sufficient to determine a conductor fault location associated with the HVDC system.

14. The HVDC power transmission and distribution network according to claim 13, wherein at least one earthing resistor has a value greater than 10 kOhms.

15. The HVDC power transmission and distribution network according to claim 10, wherein the direct current transmission earth path comprises a pair of earthing electrodes configured to provide a direct current transmission earth path parallel to and in close proximity to the faulted conductor.

16. The HVDC power transmission and distribution network according to claim 10, wherein the faulted conductor is greater than 200 km in length.

17. The HVDC power transmission and distribution network according to claim 10, wherein the cable fault ride-through system comprises no more than one earthing electrode on each of the power transmission side and the distribution side of the network.

18. The HVDC power transmission and distribution network according to claim 10, wherein the cable fault ride-through system is devoid of dc circuit breakers.

\* \* \* \* \*